April 5, 1955　　　C. C. HENSLEY　　　2,705,380
ROOTING TOOTH UNIT FOR SCRAPERS
Filed Dec. 12, 1949　　　　　2 Sheets-Sheet 2
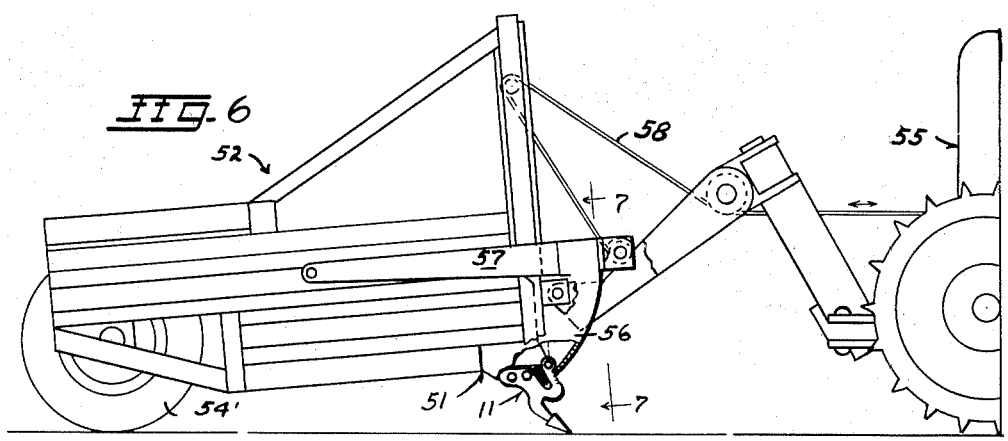
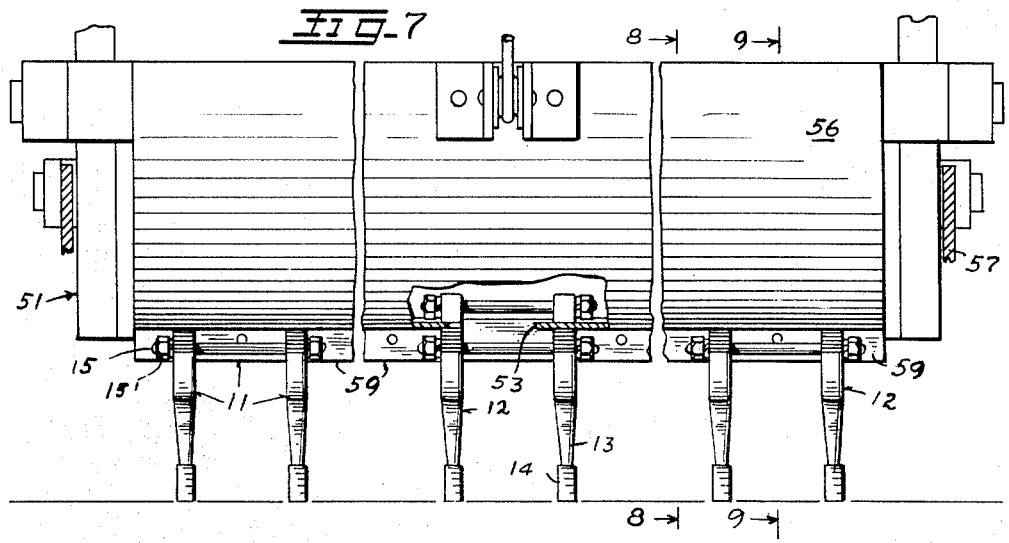
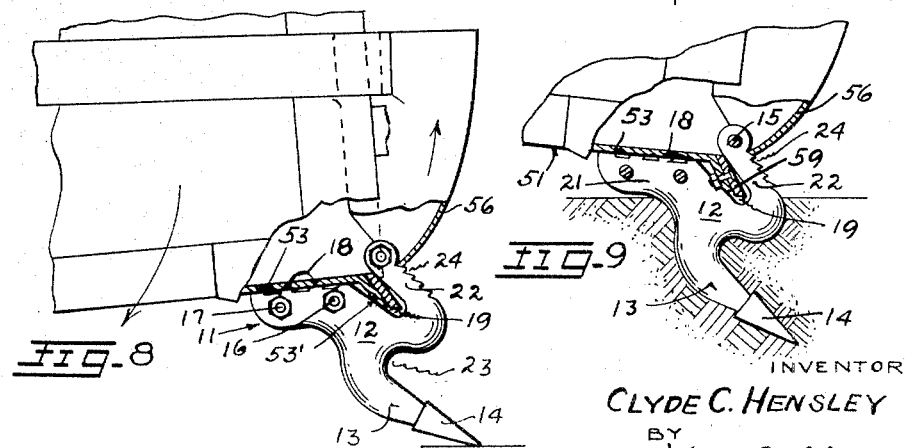
INVENTOR
CLYDE C. HENSLEY
BY
Henry N. Young
ATTORNEY United States Patent Office 2,705,380
Patented Apr. 5, 1955

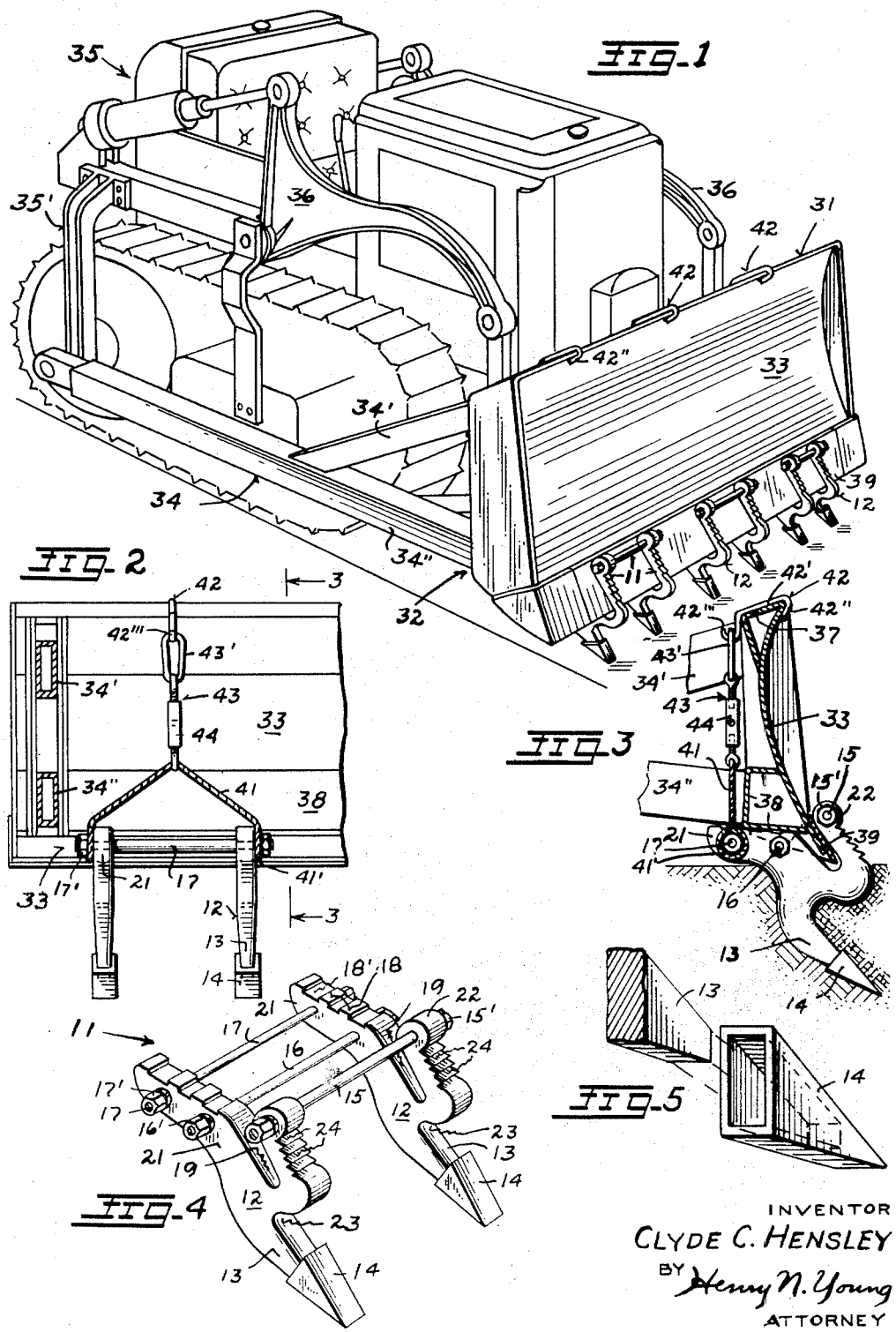

2,705,380

ROOTING TOOTH UNIT FOR SCRAPERS

Clyde C. Hensley, San Leandro, Calif.

Application December 12, 1949, Serial No. 132,532

2 Claims. (Cl. 37—145)

The invention relates to ground-rooting units for attachment at the share-blades of various dirt-moving implements and providing rooter teeth for ripping up ground surfaces of relatively hard materials such as decomposed rock, clay soils, claybound rocks, old roadbeds, and the like, to provide for the most effective operation of the share-blades and their associated moldboards against the loosened material.

An object of the invention is to provide rooting units for generally universal mounting at the share-blades of various dirt-moving implements of the scraper type, and including bulldozers and carryalls.

Another object is to provide for so mounting a present rooting unit with respect to a share-blade that its working thrust is provided substantially in the line of normal working application of the blade.

A further object is to so mount a present rooting unit with respect to a share edge of a moldboard that the moldboard is not subjected to damaging stresses during and by reason of the working application of the unit.

An added object is to provide a rooting unit of the character described which is applicable to a scraper-type implement without requiring any structural changes or additions to the latter.

Yet another object is to provide a rooter unit of the character described having its rooter teeth provided with replaceable self-sharpening working points having reversedly usable wear faces.

The invention possesses other objects and features of advantage, some of which, with the foregoing, will be set forth or be apparent in the following description thereof, and in the accompanying drawings, in which:

Figure 1 is a perspective view showing rooting units of my invention cooperatively mounted on the moldboard of a scraper of the pusher or bulldozer type.

Figure 2 is an enlarged fragmentary rear view of the installation of a rooting unit shown in Figure 1.

Figure 3 is a transverse upright section of the structural combination of Figure 2, taken on the line 3—3 in Figure 2 with the rooter teeth operatively applied.

Figure 4 is a perspective view of the rooting unit of my invention.

Figure 5 is a fragmentary perspective view showing a working point of the unit as axially dismounted with respect to a tooth of the unit.

Figure 6 is a fragmentary elevation showing a rooting unit of my invention as mounted on the share edge of the bottom of the scoop of a wheel-mounted scraper of the carryall type, the scoop and unit being inoperatively disposed with respect to the ground.

Figure 7 is an enlarged fragmentary front view of the assembly of Figure 6, taken at the line 7—7 in Figure 6.

Figure 8 is a fragmentary sectional view taken at the line 8—8 in Figure 6.

Figure 9 is a fragmentary sectional view taken at the line 9—9 in Figure 6, but showing the rooter teeth operatively applied.

As particularly illustrated, a rooter unit 11 of my invention essentially comprises a pair of planar elements 12 of generally triangular conformation and each having a point portion 13 thereof comprising a rooter tooth which replaceably mounts a wedge-shaped wear-point member 14 in wedgedly retained sheathing relation to it. Mutually parallel spacing rods 15 and 16 and 17 connect the pair of elements 12 in mutually parallel and rigid relation, whereby each unit 11 essentially comprises a pair of elements 12 and the set of three spacing rods 15 and 16 and 17 and a pair of point members 14. In a present structure, each of the spacing rods has reduced and threaded end portions extending through complementary transverse bores through the elements 12 and mounting clamp nuts 15' and 16' and 17' for fixing the elements thereto, with the spacing of the elements 12 of a pair determined by the distance between the shoulders at the ends of the intermediate unreduced rod portions.

It will now be noted that a rearward portion of the edge of each rooting element 12 opposite its tooth portion 13 provides a flat bearing face 18 which is shown as interrupted by a series of cross-slots 18', and a transverse notch 19 is provided in said edge forwardly of the bearing face 18 whereby the element is of a generally forked form having a rear arm portion 21 providing the bearing face 18 and a forward arm portion 22 which extends somewhat beyond the plane of said face. For reasons to be hereinafter brought out, the forward edge of the tooth portion 13 of the element 12 is in generally parallel and rearwardly offset relation to the forward upper edge portion of the arm 22 whereby the base portion of the arm 22 and the forward face of the tooth 13 define a notch 23 with respect to be forward side line of the element. Also, said upper arm edge portion is provided with a plurality of cross-teeth providing notches 24 between them for use in a manner hereinafter described.

A present element 12 is arranged to be mountedly engaged with a share-blade carried by a moldboard member or the like to receive the blade edge in its notch 19 while the bearing face 18 of its arm 21 and the rearward face of its arm 22 respectively engage opposite sides of the moldboard assembly. Noting that a present element 12 is arranged for working application in its plane when so mounted at a share-blade and is therefore subjected to lateral stresses which tend to transversely rock it from its desirable fixed angular relation to the plane of the blade, the provision of a unit 11 by rigidly connecting a pair of elements 12 by the described spacing rods is understood to utilize each element of a pair as a brace for the other to thereby cooperatively secure both elements of a pair against lateral deflection and so provide the necessary rigidity of mounting entirely by means forming part of the unit. The elements 12 are preferably of a tough and resiliently flexible ferrous alloy such as a manganese-vanadium steel of low-carbon content.

It will be understood that the provision of the spacing rods 15 and 16 and 17 solely at the top portion of a unit 11 provides the desired rigidity of the unit with a minimum of interference of the loosened material with the operative progress of the unit. A present unit 11, in which the spacing rods 15 and 16 define a plane adjacent and parallel to the bearing face 18, and in which the forward spacing rod 17 connects the upper ends of the arms 22, provides a particularly effective assembly for its purposes, the number and arrangement of the spacing rods adjacent the top of the unit being variable as desired for units of different size or form than that illustrated.

Referring now to the installation of units 11 illustrated in Figures 1 to 3 inclusive, it will be noted that the units are particularly shown as mounted on the working head 31 of a bulldozer unit 32, said head comprising an upright moldboard 33 carried at the forward extremities of forked beams 34 which are hingedly attached at their rearward ends at aligned opposite side points of the frame 35' of a tractor 35. The present tractor 35 is shown as of the tracklaying type and is provided with hydraulically-controlled levers 36 which are linked to upper forward points of the upper arms 34' of the beam 34 for controlling the disposition of the bulldozer head 31 with respect to the ground supporting the bulldozer. The present moldboard 33 is rearwardly concaved, has a rearwardly extending upper edge flange 37, and extends slightly below a rear box-beam assembly 38 provided at its back and having its ends attached to the lower arms 34" of the beams 34. The lower moldboard edge portion mounts a replaceable share-blade 39 which extends below it and determines the depth of ground penetration of the moldboard assembly during its normal use as a dirt-pushing element.

When the ground to be worked is too hard for a smooth operation of the bulldozer share-blade 39 along it at a desired sub-surface level, the bulldozer head 31 is converted into a scarifying head by removably mounting an appropriate number of rooting units 11 on the moldboard along its working edge to dispose the line of rooting teeth 13 thereof in obliquely depending relation to the moldboard, whereby a lowering of the teeth into the ground and the forward propulsion of the bulldozer may rip up or scarify a surface layer of the ground for its subsequent handling by the moldboard alone. Normally, the rooting and bulldozing operations would be performed successively by the same bulldozer, but under certain favorable ground conditions the bulldozing of a top layer of ground might be effected simultaneously with a rooting or ripping of the next underlying layer of ground.

Having the bulldozer head 31 appropriately raised from the ground, a unit 11 may be mounted on the head by lifting it into place to receive the bulldozer share-blade 39 in the notches 19 of its elements 12. As shown, the positioned rooting unit 11 is arranged to be secured in its mounted position by means of the connection of a flexible cable bail 41 having terminal eyes 41' receiving the extending ends of the rearward spacing rod 17 therethrough with a hook member 42 engaged over the top of the moldboard 33, the connection being made by means of a sectional link rod 43 having a turnbuckle nut 44 connecting its sections. The present hook member 42 comprises a straight shank portion 42' connecting a return bend portion 42" at its forward end and a hook 21''' extending from the same side of the shank 42' as the bend 42" for engagement in the top eye 43' of the turnbuckle link 43.

The mounting of a unit 11 on a moldboard 33 is not necessarily completely firm, it being particularly noted that a working advancement of the teeth 13 is arranged to generally force the elements 12 rearwardly on the receiving moldboard edge to rock these at inner forward points of engagement of the arms 22 with the front of the moldboard at the share-blade 39 while positively seating their top edge faces 18 with the under side of the box-beam 38 of the moldboard assembly. When the unit is so disposed, the cutting edge of the share-blade is free of contact with the elements 12, and so may not be bent or damaged by said elements during the use of the unit, this feature comprising an important feature of design of the present elements 12. When a unit 11 is to be dismounted from a moldboard with which it has been used, it is merely necessary to slack off the link 43 by an appropriate turning of the turnbuckle nut 44 to permit a disengagement of the hook 42 from the link 43 and a free falling of the unit from its mounted position.

Figures 6 to 9 inclusive show rooting units 11 mounted at and along the working edge of the bottom 53 of the scoop 51 of a wheeled scraper 52 which has the forward end of its frame 54 carried from the rear end of a towing tractor 55 for a swinging adjustment of the frame about the axis of rear support wheels 54' for adjusting the height of the forward edge of the scoop bottom. The present scoop bottom 53 has an angularly downturned forward edge portion 53' which is arranged to function as a moldboard during a pick-up actuation of the scoop against loose ground, and releasably carries a share-blade 59 across its front as a moldboard element. The scoop 51 is provided with a usual swinging gate or apron 56 which is arranged for lowering against the share-blade of the scoop to retain a load of picked-up dirt in the scoop during a carrying of the raised load to a dumping point, said gate being carried on arms 57 hinged to the sides of the frame 54 and having its position with respect to the scoop moldboard portion 53' controlled by a lift cable 58 extending from the tractor 55 and under control of the tractor operator.

Understanding that the scoop bottom 53 is respectively disposable below and above a horizontal position in the scraping and carrying operations of the scoop, the present scarifier units 11 are arranged for mounting on the forward moldboard portion 53' of the scoop bottom for working extension therefrom in a manner corresponding to similar units mounted at the bottom of a bulldozer moldboard, the moldboard 53' with its share-blade 59 extending into the notches 19 of the rooter elements 12.

By particular reference to Figure 9, it will be noted that, under working conditions, an upper point of the rearward edge face of the forward arm portion 22 of each element 12 bears transversely against the opposed moldboard (share-blade) point while the bearing face 18 of the element bears flat against the under side of the bottom 53; the relation of a mounted element 12 to the bottom 53 and its forward moldboard portion 53' corresponds to the relation of a mounted element 12 to the box beam 38 and moldboard 33 of the bulldozer head 31.

When a scarifier or rooter unit 11 is mounted on the moldboard assembly comprising the bottom portion 53' and the share-blade 59, the gate 56 may be lowered to engage its bottom edge is opposed notches 24 at the fronts of the arms 22 of the elements 12 of each mounted unit 11 for securing the mounted units to the scoop, whereby a forward movement of the scoop with the rooter teeth 13 of the elements 12 engaged in the ground (Fig. 9) will rip and stir a surface layer of ground for loosening it. It will be understood that the engagement and retention of the element arms 22 between the opposed moldboard face and the gate edge effects a releasable mounting of the rooting units on the scoop, whereby such units are released merely by raising the gate and may be positively removed by thereafter backing the scraper while the teeth 13 of the units 11 are engaged with the ground.

From the foregoing disclosures of the mounting of like units 11 at the moldboards of scrapers of both the pusher and carrier types, it will be understood that a present rooting tooth unit 11 is equally well adapted for installation on whichever type of equipment is being used on a particular dirt-moving job and is therefore of generally universal utility. A present rooting-tooth unit also has the additional advantage of being mountable on a usual scraper without requiring any structural changes or additions thereto. Then too, a mounted unit 11 is operative in the general thrust line of the associated working moldboard edge for its most effective rooting action while avoiding distorting reactions upon the element providing the moldboard or again the vehicle frame.

From the foregoing description taken in connection with the accompanying drawings, the advantages of the present rooting-tooth unit will be readily understood by those skilled in the art to which the invention appertains. While I have described the principle of operation, together with a form of my invention which I now consider to comprise a preferred embodiment thereof, I desire to have it understood that the showing is primarily illustrative, and that such changes and developments may be made, when desired, as fall within the scope of the following claims.

I claim:

1. For removable mounting on an earth-moving machine providing a ground-scraping moldboard having its working edge portion extending downwardly and forwardly from a member having a downwardly directed face, a rooter element comprising a generally triangular planar element having forward and rear edges thereof extending from an upper edge and mutually coterminous at a depending V-shaped rooting tooth and provided with a transverse V-shaped notch extending obliquely forwardly from the forward end of a flat upper edge portion opposite the tooth and being arranged to freely receive the extending working edge portion of moldboard for a transverse bearing engagement of said upper edge portion of the rooter with said downwardly directed face of the member from which the moldboard extends, the bisecting plane of said tooth transversely of the element being rearwardly offset from the bisecting plane of the notch transversely of the element in generally parallel relation thereto and intersecting the plane of said upper edge portion rearwardly of the notch.

2. For removable mounting on an earth-moving machine providing a ground-scraping member having an elongated working edge portion extending downwardly and forwardly and fixedly with respect to an under face of the member, a rooter element of generally triangular planar form having forward and rear edges extending from an upper edge thereof and mutually coterminous at a depending V-shaped rooting tooth and provided with a transverse V-shaped notch extending obliquely forwardly from the forward end of a flat upper edge portion opposite the tooth and being arranged to freely receive the extending working edge portion of the moldboard for a transverse bearing engagement of said upper edge portion of the rooter with said under face of the ground-scraping member and the bearing engagement of the forward side of the notch with the forward side of the working edge portion of the ground-scraping member while the tooth is operatively applied, the bisecting plane of said tooth transversely of the element being rearwardly offset from the bisecting plane of the notch transversely of the element in generally parallel relation thereto and intersecting the plane of said upper edge portion rearwardly of the notch whereby the working reaction of the tooth is arranged to maintain the operative position of the element on the ground-scraping member against the action of gravity, and a means independently cooperative between the machine and the rooter element to retain the latter on said machine member in position for the working application of the tooth while the tooth is not operatively applied to the ground.

References Cited in the file of this patent

UNITED STATES PATENTS

| Number | Name | Date |
|---|---|---|
| 1,191,459 | Pitner | July 18, 1916 |
| 1,527,189 | Honstain | Feb. 24, 1925 |
| 1,872,601 | McHale | Aug. 16, 1932 |
| 1,909,850 | Younie | May 16, 1933 |
| 2,105,320 | Heil | Jan. 11, 1938 |
| 2,275,601 | Austin et al. | Mar. 10, 1942 |
| 2,281,928 | Fletcher | May 5, 1942 |
| 2,322,432 | Forte | June 22, 1943 |
| 2,384,957 | Murphy | Sept. 18, 1945 |
| 2,446,074 | Blackmore | July 28, 1948 |
| 2,497,351 | Fletcher | Feb. 14, 1950 |